Dec. 21, 1926.

M. L. SINDEBAND ET AL 1,611,687

SYSTEM OF PROTECTION FOR ALTERNATING CURRENT CIRCUITS

Filed July 18, 1919   3 Sheets-Sheet 1

INVENTORS
Maurice L. Sindeband
George N. Tidd
Charles B. Waters
BY
ATTORNEY

Dec. 21, 1926. 1,611,687
M. L. SINDEBAND ET AL
SYSTEM OF PROTECTION FOR ALTERNATING CURRENT CIRCUITS
Filed July 18, 1919 3 Sheets-Sheet 2
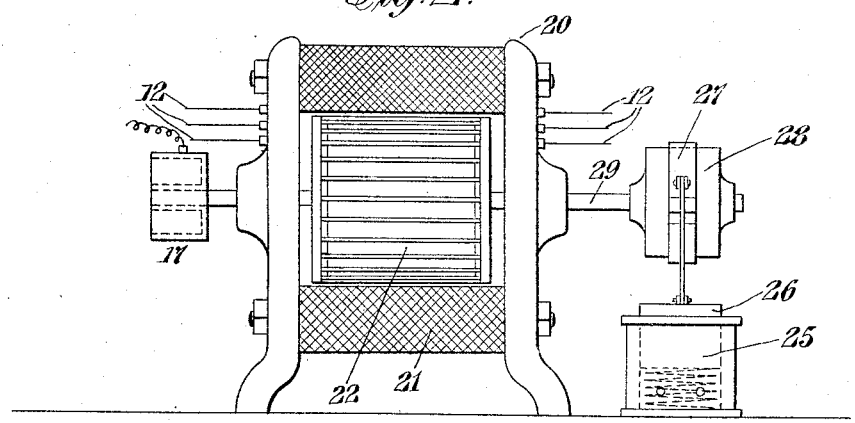
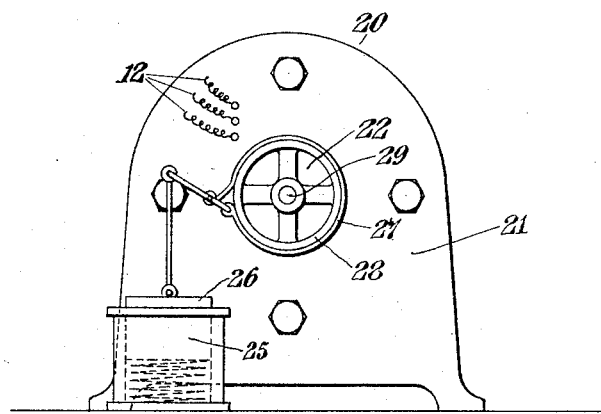
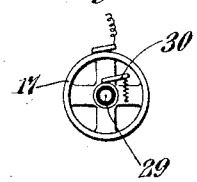
INVENTORS
Maurice L. Sindeband.
George N. Tidd.
Charles B. Waters.
BY
ATTORNEY Dec. 21, 1926.
M. L. SINDEBAND ET AL
1,611,687
SYSTEM OF PROTECTION FOR ALTERNATING CURRENT CIRCUITS
Filed July 18, 1919   3 Sheets-Sheet 3
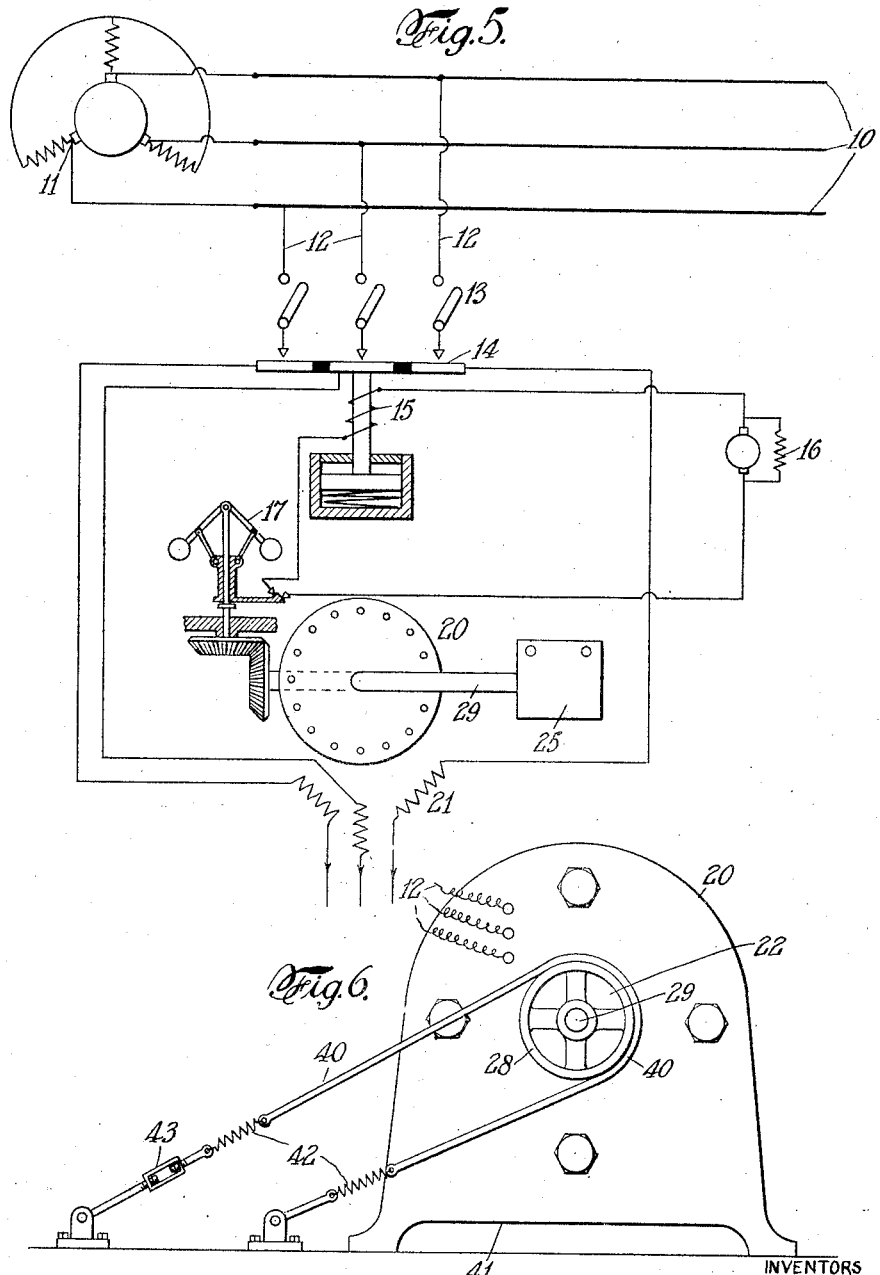
INVENTORS
Maurice L. Sindeband
George N. Tidd
Charles B. Waters
BY
ATTORNEY Patented Dec. 21, 1926.

1,611,687

UNITED STATES PATENT OFFICE.

MAURICE L. SINDEBAND, OF NEW YORK, N. Y.; GEORGE N. TIDD, OF ELIZABETH, NEW JERSEY; AND CHARLES B. WATERS, OF NEW YORK, N. Y.

SYSTEM OF PROTECTION FOR ALTERNATING-CURRENT CIRCUITS.

Application filed July 18, 1919. Serial No. 311,786.

The invention relates to the protection of alternating current circuits, transmission systems and power house apparatus employed in connection therewith, particularly where the same may be subject to an extremely heavy load and to surges or short circuits, especially where a number of systems are interconnected. It has for its object, in a system of this character wherein means are provided to interrupt the circuit during short circuit conditions, to introduce, gradually and automatically, impedance into the said abnormal circuit to thereby reduce the current therein to a value where the circuit interrupting means may safely be allowed to function. It is the general practice to install switches in power plants of sufficient rupturing capacity to accommodate the short circuit conditions resulting from the operation of the generating system or systems. This requires, in many instances, large and expensive circuit breakers or corresponding circuit interrupting means. In the use of these large capacity switches or circuit breakers, under the heavy currents prevailing during short circuit conditions, considerable damage and strain is occasioned by their operation. With the improvements hereinafter described, not only may the size of these switches be considerably reduced, but shock to the system is minimized, in that there is provided a variation of impedance resulting in gradual reduction of current, as set forth, prior to the functioning of the circuit interrupting means. Under normal conditions, this impedance is low and does not affect the voltage regulation, but, for the short circuit conditions, can be made of any value to suit the requirements and commensurate with the rupturing capacity of the switches. The present practice precludes the use of reactors of high inductance in the circuit during normal conditions.

In the accompanying drawings, which illustrate the invention—

Fig. 2 is a detail view of the variable impedance device employed, together with control device therefor and centrifugal switch operated thereby.

Fig. 3 is an end view thereof.

Fig. 4 is a detail fragmentary end view illustrating the centrifugal switch.

Fig. 5 is a diagrammatic view illustrating a modified arrangement for controlling the variable impedance device; and Fig. 6 is an end view of said device and control therefor.

Similar characters of reference designate corresponding parts thruout the several views.

Figure 1:
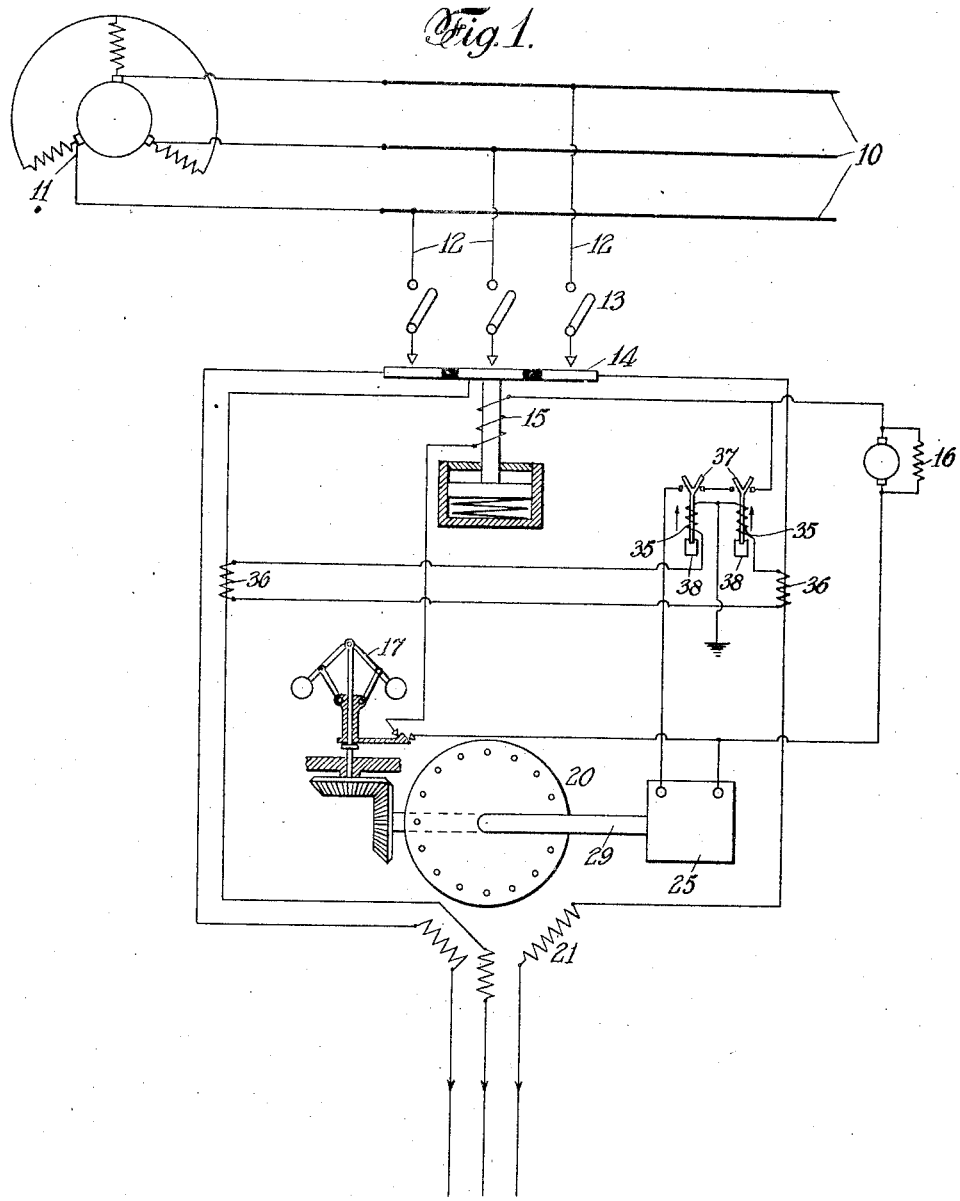
Fig. 1 is a diagrammatic view, illustrating the various apparatus and electrical connections thereto.

Referring to the drawings, more particularly to Fig. 1 thereof, 10 designates the various bus-bars which are designed to be fed, for example, from a three-phase A. C. generator 11, altho it is to be understood that the invention is equally applicable to a single- or to a poly-phase system. A suitable feeder 12, or feeders, for example a three-phase feeder as illustrated, is connected to the bus-bars 10 and derives power therefrom. Included in each leg of the feeder 12 are disconnecting switches 13 and circuit interrupting means 14, the latter being, for example, circuit breakers or oil switches designed to be opened thru the operation of a trip coil 15, as is well understood. The trip coil 15 is included in a local D. C. circuit, including a D. C. generator 16 or other suitable source of direct current, and a switch device 17, preferably a centrifugal switch, controlled as hereinafter set forth.

In accordance with the invention, there is further included in each feeder circuit or circuits an impedance member or device 20 comprising, for example, a stator 21 having a distributed winding in series with the legs of the feeder 12 and a rotor 22 which may be of the well-known "squirrel cage" type of short-circuited bars, one of said members providing a field revolving synchronously with the alternations of the feeder current, and the other being magnetically coupled with the former to effect a torque between said stator and rotor members. Under normal conditions, this device, having a short-circuited secondary, introduces but slight impedance into the circuit or circuits and is so designed and controlled that the impedance may be increased prior to the interruption of the feeder circuit or circuits, the increase of impedance being gradually and automatically effected under abnormal conditions to correspondingly reduce the current flowing. Under ordinary conditions, the rotor would be caused to turn thru the flow of current in the feeder, and introduce thereby a very considerable impedance into the circuit. It is the purpose of the present invention, however, to render this impedance ineffective until abnormal conditions arise; and to this end, means are provided to normally hold the rotor 22 against rotation, whereby only a very slight impedance will be present due to the inclusion of the said device in the feeder circuit.

The introduction of the impedance may be effected in any convenient manner, for example thru the operation of a solenoid 25 having its plunger 26 normally magnetically held thru the closing of a local circuit which may be energized from the D. C. generator 16.

The solenoid 25 acts thru suitable intermediate mechanism upon a friction or brake band 27 surrounding pulley 28 on shaft 29 of the rotor 22 to hold said pulley and its shaft against rotation. In this manner, the device will not be permitted to function during normal conditions, and so long as, preferably, closed circuit conditions are maintained in the local solenoid circuit. Shaft 29 of the device is arranged, moreover, to operate a centrifugal contact member 30 (Fig. 4) of the switch 17, said member being designed to close the local circuit for the trip coil 15 when the shaft 29 attains a predetermined speed. This device, also, is of well-known type and its operation need not be further described.

In order to control the local circuit energizing the solenoid 25, suitable inverse, time-limit relays 35 are included in the said local circuit, being actuated by the current derived from current transformers 36, in the present instance two, coupled to the feeder 12. In this manner, under normal conditions, when the current flowing thru the feeder is not excessive, the relays 35 maintain the local circuit closed at the contacts 37, and the impedance device, therefore, is unable to function. However, under abnormal conditions, as during a short circuit when excessive current obtains in a feeder, the relays 35 open the local circuit for the solenoid, releasing the plunger of the latter and thereby brake band 27 to permit rotation of the rotor 22, which gradually attains its full velocity of rotation. This automatically and gradually effects the introduction of the desired impedance into the feeder circuit until the current flowing therethru is reduced to a value which will make it safe to interrupt the said circuit. By this time, the centrifugal switch 17 will have also closed the local circuit for the trip coil 15, causing the operation of the circuit-interrupting means to open the feeder circuit or circuits in which the abnormal condition obtains. In order to give the impedance device sufficient time to introduce the desired reactance and to correspondingly delay the operation of the trip coil 15, the return of the relay contacts is delayed or damped, in any well-known manner as thru dash pots 38, so that the local circuit for the solenoid may not be closed prior to the operation of the trip coil 15.

Referring to Figs. 5 and 6, an arrangement is set forth whereby the current relays, as well as solenoid and corresponding local circuit, may be entirely dispensed with. To this end, the rotor 22 is arranged to be retarded or stalled by a resisting torque greater than the torque which the impedance member develops under normal conditions, that is, when an approximately normal or a slightly greater than normal current passes thru the windings 21. The pulley 28 on the rotor shaft 29 in this embodiment is acted upon by a friction band 40 whose ends are connected, for example to the base 41 upon which the impedance member is secured. Suitable springs 42 may be attached to the ends of the band 40, and by means of a turn buckle 43, the required tension on the band 40 may be obtained. In this manner, the torque produced by the brake band 40 upon pulley 28 will be sufficient to maintain rotor 22 stationary when the current flowing thru a feeder or feeders is substantially normal. However, when excessive current flows thru the impedance member 20, a greater torque will be developed which will be sufficient to overcome the torque exerted by the band 40, and the rotor 22 will be caused to rotate, operating the centrifugal switch device 17 when the proper speed is attained. By this expedient, the transformers 36, current relays 35 and solenoid 25, together with the corresponding local circuit, are eliminated.

However, the invention is not limited to the particular means shown and described for normally holding the impedance device inactive, nor to the particular character of the impedance device itself, as other expedients may be employed for reducing the current in the feeder circuit prior to the actuation of the interrupting means for said circuit.

We claim:

1. A protected alternating current circuit having in combination: circuit interrupting means therein, a rotatable reactor member controlling the circuit interrupting means, and means controlling the reactor member to effect the gradual introduction of impedance into the circuit under excess current conditions prevailing in said circuit.

2. A protected alternating current circuit having in combination: circuit interrupting means therein, an impedance member permanently included in series in the circuit, means controlling same to vary the impedance in the circuit, and means controlled by the operation of the impedance member to actuate the circuit interrupting means.

3. A protected alternating current circuit having in combination: circuit interrupting means therein, a rotatable reactor member, means controlling the reactor member to effect a gradual and automatic introduction of impedance into the circuit, and means controlled by the operation of the impedance member to actuate the circuit interrupting means.

4. A protected alternating current circuit having in combination: circuit interrupting means therein and means to effect operation of same, an impedance member to introduce impedance into the circuit, having a stator winding in series with the circuit and a rotor, and means normally holding its said rotor stationary.

5. A protected alternating current circuit having in combination: circuit interrupting means included therein and means to effect operation of same, an impedance member to introduce impedance into the circuit, having a stator winding in series with the circuit and a rotor comprising short-circuited bar windings, and means to normally hold the rotor stationary.

6. A protected alternating current circuit having in combination: circuit interrupting means therein and means to effect operation of same, an impedance member to introduce impedance into the circuit, having a stator winding in series with the circuit and a rotor, and a friction device to normally hold the rotor stationary.

7. A protected alternating current circuit having in combination: circuit interrupting means therein and means to effect operation of same, an impedance member to introduce impedance into the circuit, having a stator winding in series with the circuit and a rotor, a friction device to normally hold the rotor stationary, a solenoid operatively connected to said friction device, and means controlled by the current of the circuit to actuate said solenoid.

8. A protected alternating current circuit having in combination: circuit-interrupting means therein and means to effect operation of same, an impedance member to introduce impedance into the circuit, having a stator winding in series with the circuit and a rotor, a friction device to normally hold the rotor stationary, a solenoid operatively connected to said friction device, current transformers coupled to the circuit, electric protective relays operated by said transformers, a local circuit, including the solenoid and adapted to be opened by said relays when the current of the alternating current circuit exceeds a predetermined value.

9. A protected alternating current circuit having in combination: circuit interrupting means therein and means to effect operation of same, an impedance member to introduce impedance into the circuit, having a stator winding in series with the circuit and a rotor, a friction device to normally hold the rotor stationary, a solenoid operatively connected to said friction device, current transformers coupled to the circuit, inverse time-limit current relays operated by said transformers, a local circuit including the solenoid and adapted to be opened by said relays when the current of the alternating current circuit exceeds a predetermined value.

10. A protected alternating current circuit having in combination: circuit interrupting means therein and means to effect operation of same, an impedance member to introduce impedance into the circuit, having a stator winding in series with the circuit and a rotor, a friction device to normally hold the rotor stationary, a solenoid operatively connected to said friction device, current transformers coupled to the circuit, electrical protective relays having their return motion damped and operated by said transformers, a local circuit including the solenoid and adapted to be opened by said relays when the current of the alternating current circuit exceeds a predetermined value.

11. A protected alternating current circuit having in combination: circuit interrupting means therein and including a trip coil, an impedance member to introduce impedance into the circuit, having a stator winding in series with the circuit and a rotor, means normally holding the rotor stationary, a centrifugal contact member, and local circuit therefor, the said contact member being operatively connected to the rotor of said impedance member and adapted to close the circuit to the trip coil of the circuit interrupting means.

Signed at New York, in the county of New York and State of New York, this 16th day of July, A. D. 1919.

MAURICE L. SINDEBAND.
GEORGE N. TIDD.
CHARLES B. WATERS.